(12) United States Patent
de Groot

(10) Patent No.: US 6,249,351 B1
(45) Date of Patent: Jun. 19, 2001

(54) GRAZING INCIDENCE INTERFEROMETER AND METHOD

(75) Inventor: Peter de Groot, Middletown, CT (US)

(73) Assignee: Zygo Corporation, Middlefield, CT (US)

(*) Notice: Subject to any disclaimer, the term of this patent is extended or adjusted under 35 U.S.C. 154(b) by 0 days.

(21) Appl. No.: 09/325,175

(22) Filed: Jun. 3, 1999

(51) Int. Cl.⁷ ................................................. G01B 9/02
(52) U.S. Cl. ................................................. 356/512; 356/521
(58) Field of Search ................................. 356/345, 353, 356/354, 450, 521, 512, 511

(56) References Cited

U.S. PATENT DOCUMENTS

| | | |
|---|---|---|
| 4,325,637 | 4/1982 | Moore . |
| 4,498,771 | 2/1985 | Makosch et al. . |
| 4,653,922 | 3/1987 | Jarisch et al. . |
| 4,948,257 | 8/1990 | Kaufman et al. . |
| 4,983,042 | 1/1991 | Korner et al. . |
| 5,268,742 | 12/1993 | Magner . |
| 5,337,146 | 8/1994 | Azzam . |
| 5,502,564 | 3/1996 | Ledger . |
| 5,532,821 | 7/1996 | Tronolone et al. . |
| 5,568,256 | 10/1996 | Korner et al. . |
| 5,598,265 | 1/1997 | de Groot . |
| 5,654,798 | 8/1997 | Bruning . |
| 5,786,896 | 7/1998 | Hizuka . |

FOREIGN PATENT DOCUMENTS

| | | |
|---|---|---|
| 106 769 | 7/1974 | (DE) . |
| 233 644 A1 | 3/1986 | (DE) . |
| 261 422 A1 | 10/1988 | (DE) . |
| 40 03 100 A1 | 8/1991 | (DE) . |
| 1163161 | 6/1985 | (SU) . |

OTHER PUBLICATIONS

"High–Precision Mechanical Profilometer for Grazing Incidence Optics," Joseph R. Cerino et al., Proc. SPIE vol. 2263, pp. 253–262, Sep. 1994.

http://192.149.147.105/cgi–bin/bibquery.pl?bibcode= 1994SPIE; SPIE Web, InCite Publications Search: Cerino, Joseph R. et al., Journal: Proc. SPIE vol. 2263, pp, 253–262, "Current Developments in Optical Design and Optical Engineering IV," Sep. 1994.

http://www.qualitymag.com/02f2.html; Mary Litsikas, "Don't Assume It's Flat," Quality Magazine, Feb. 1996.

Letter from Lars Selberg of ZYGO Corp., Middlefield, CT, Nov. 29, 1994, 5 pages.

"On–Line Detection of Surface Defects on Steel Billets Using Multiple Grazing Incidence Light Sources," Marc L. Dufour et al., SPIE vol. 1614 Optics, Illumination, and Image Sensing for Machine Vision VI, 1991, p 35–44, "Computer Vision Metrology via Grazing Incidence Imaging," J.L. Pracht et al., SPIE vol. 1820, Videometrics, 1992, pp. 83–92.

"Holographic Interferometer to Test Optical Surfaces," Fernando Broder–Bursztyn et al., Applied Optics, vol. 14, No. 9, Sep. 1975, pp. 2280–2282.

"Double–Pass Oblique–Incidence Interferometer for the Inspection of Nonoptical Surfaces," I.J. Wilson, Applied Optics, vol. 22, No. 8, Apr. 15, 1983, pp. 1144–1148.

(List continued on next page.)

Primary Examiner—Frank G. Font
Assistant Examiner—Andrew H. Lee
(74) Attorney, Agent, or Firm—Fish & Richardson P.C.

(57) ABSTRACT

A two-beam interferometer illuminates a sample surface with light at grazing incidence angles for the purpose of analyzing a surface characteristic such as surface topography. The interferometer includes a diffractive-optic beam splitter, which separates an incoming light beam into measurement and reference beams and a diffractive-optic beam combiner, which produces an output beam by interfering portions of the reference beam with reflected portions of the measurement beam. Those portions of the reference wavefront and the measurement wavefront that interfere originate from substantially the same portion of the initial illumination wavefront.

88 Claims, 11 Drawing Sheets

OTHER PUBLICATIONS

"Oblique Incidence Interferometry for Gear Tooth Surface Profiling," Tomomi Ino et al., SPIE vol. 1720, 1992, pp. 464–469.

"A Simple Laser Interferometer," C.R. Munnerlyn, Applied Optics, vol. 8, No. 4, Apr. 1969, pp. 827–829.

"All Grazing Incidence Interferometer for Testing and in situ Alignment of Imaging X–Ray Optics," Robert J. Speer et al., SPIE vol. 184 Space Optics–Imaging X–Ray Optics Workshop, 1979, pp. 172–175.

"Precision Surface Figure Measurements of Large Flat Mirrors Using Grazing Incidence Interferometery," A.L. Duncan et al., SPIE vol. 818 Current Developments in Optical Engineering II, 1987, pp. 373–380.

"Interferometer for Investigation of Large Plane Surfaces," V. P. Linnik, C.R. of Academy of Science U.S.S.R. vol. 32, No. 3, 1941, pp. 189–191 (in Russian).

"Dimensional Metrology of Length Standards by Holographic Interferometry With Phase Heterodynage," M. Grossmann et al., SPIE vol. 136 1st European Congress on Optics Applied to Metrology, 1977, pp. 92–100.

"A High–Resolution Laser Scale Interferometer," Hideto Iwaoka et al., SPIE vol. 503 Application, Theory, and Fabrication of Periodic Structures, 1984, pp. 135–139.

"A diffraction Grating Interferometer," R. Kraushaar, Journal of the Optical Society of America, vol. 40, No. 7, Jul. 1950, pp. 480–481.

"Grazing Incidence Interferometry Applied to Non–Optical Surfaces," K. G. Birch, National Physical Lab. Report MOM 4, Mar. 1973, 22 pages, 18 sheets of drawings.

"The 'Interferoscope' a New Type of Interferometer with Variable Fringe Separation," Nils Abramson, Optik 30 Heft 1, 1969, pp. 56–71.

"Interferometer for Large Surfaces," James B. Saunders et al., Journal of Research of the National Bureau of Standards, vol. 62, No. 4, Apr. 1959, Research Paper 2943, pp. 137–139.

"Phase Shifting In an Oblique Incidence Interferometer," Doris Boebel et al., Optical Engineering, Dec. 1991, vol. 30, No. 12, pp. 1910–1914.

"Interferometric Measurement of Form, Waviness and Roughness of Fine–Machined Surfaces," G. Spur et al. Technisches Messen 59 (1992) 11, pp. 423–427.

"Automatic Measurement of Surface Height with the Interferoscope," Torgny E. Carlsson et al., Opt. Eng. 35 (10) 2938–2942, Oct. 1996, pp. 2938–2942.

"Semiconductor Wafer and Technical Flat Planeness Testing Interferometer," Johannes Schwider et al., Applied Optics, vol. 25, No. 7, Apr. 1996, pp. 1117–1121.

"The Interferometric Analysis of Flatness by Eye and Computer," Charles Edward Synborski, SPIE, vol. 135, Developments in Semiconductor Microlithography III, 1978, pp. 104–110.

"Multipass Interferometry," P.H. Langenbeck, Applied Optics, vol. 8, No. 3, Mar. 1969, pp. 543–552.

Physical Optics, by Robert W. Wood, 3rd ed., Optical Society of America, pp. 165–166.

Principles of Optics, Max Born et al., 6th ed., Pergamon Pres, pp. 262–263.

"Measurement of Nonoptical Surfaces for Determination of Poisson's Ratio by Oblique Incidence Interferometry," Yukitoshi Otani et al., Opt. Eng. 37(1), Jan. 1998, pp. 261–265.

"Non–Contact Measuring Profile of Magnetic Disk with Optical Methods," Zhao Yang et al., SPIE vol. 2321, pp. 235–237.

"Application of the 'Interferoscope' to Spherical and Aspherical Surfaces," K.G. Birch, Optik, vol. 36, No. 4 pp. 399–409.

"Interferometric Flatness Testing of Nonoptical Surfaces," J.D. Briers, Applied Optics, vol. 10, No. 3, Mar. 1971, pp. 519–524.

"Interferometric Flatness Testing of Silicon Wafers," R. Feitscher et al., "Proc. Fringe 89," 1989, pp. 57–61.

"Evaluation of Interference Patterns in a Prism Interferometer," Gunter Spur et al, in Optical Shape Measurement and CAD, pp. 230–236.

"Oblique Incidence Interferometry of Rough Surfaces Using a Novel Dove–Prism Spectrometer," Myles D.A. MacBean, Applied Optics, vol. 23, No. 22, Nov. 15, 1984, pp. 4024–4028.

"Oblique Incidence and Observation Electronic SpecklePattern Interferometry," C. Joenathan, Applied Optics, vol. 33, No. 31, Nov. 1, 1994, pp. 7307–7311.

"An Oblique Incidence Interferometer," M.V.R.K. Murty et al., Optical Engineering, vol. 15, No. 5, Sep.–Oct. 1976, pp. 461–463.

"Oblique Incidence Interferometry Applied to Non–Optical Surfaces," K.G. Birch, Journal of Physics E. Scientific Instruments 1973, vol. 6, pp. 1045–1048.

"Imaging Characteristics of Prism Interferometers," Gunter Spur et al., SPIE vol. 1983 Optics as a Key to High Technology, 1993, pp. 702–703.

"Improved Oblique–Incidence Interferometer," P. Hariharan, SPIE, reprinted from Optical Engineering, vol. 14(3), May–Jun. 1975, pp. 80–81.

"Interferometric Testing of Technical Surfaces with Computer Generated Holograms," Sven Brinkmann et al., SPIE, vol. 3098, 1997, pp. 83–89.

"Interferometric Surface Mapping with Variable Sensitivity," W. Jaerisch et al., Applied Optics, vol. 17, No. 5, Mar. 1, 1978, pp. 740–743.

"A Simple Inverting Interferometer," P.N. Puntambekar et al., Optica Acta, vol. 18, No. 10, 1971, pp. 719–728.

"Lloyd Interferometer Applied to Flatness Testing," P.H. Langenbeck, Applied Optics, vol. 6, No. 10, Oct. 1967, pp. 1707–1714.

"On Method of Oblique–Incidence Interferogram 'Sewing' by Three Base Points," Alexander G. Seregin et al. SPIE vol. 2340, 1994, pp. 318–327.

"Interferometer Based on Four Diffraction Gratings," F.J. Weinberg et al., Journal of Scientific Instruments vol. 36, May 1959, pp. 227–230.

"New Grazing Incidence Microscope for the Measurement of Topography with a $2\lambda$—Algorithm," Klaus Korner et al., SPIE, vol. 3098, 1997, pp. 27–34.

Ilmenau Dissertation, J. Schwider, pp. 107–110.

Physical Optics, Wood, pp. 202–203.

"Continuation of Experiments for Investigating the Cause of Coloured Concentric Rings, and Other Apearances of a Similar Nature," William Herschel, Phil. Trans. R. Soc. London 99 (1809).

Tropel Precision Optics brochures, "Optical Solutions for Equipment Manufacturers," Fairport, New York (1996) 9 pages.

Company brochure, Tropel Metrology Instruments, "Understanding the Underlying Technology," Tropel FlatMaster Series and Tropel CylinderMaster Series, Tropel Corporation, NY, 1996, 6 pages.

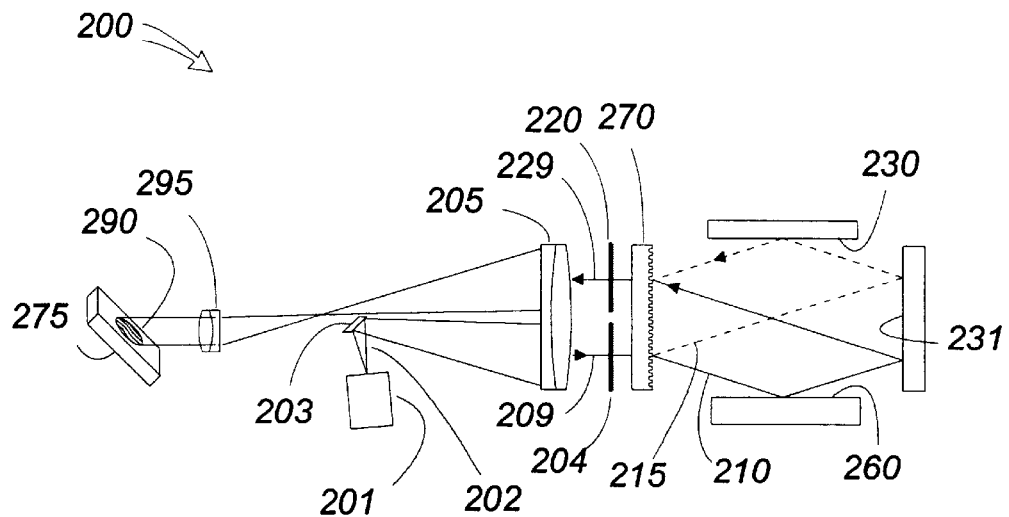
Figure 2A
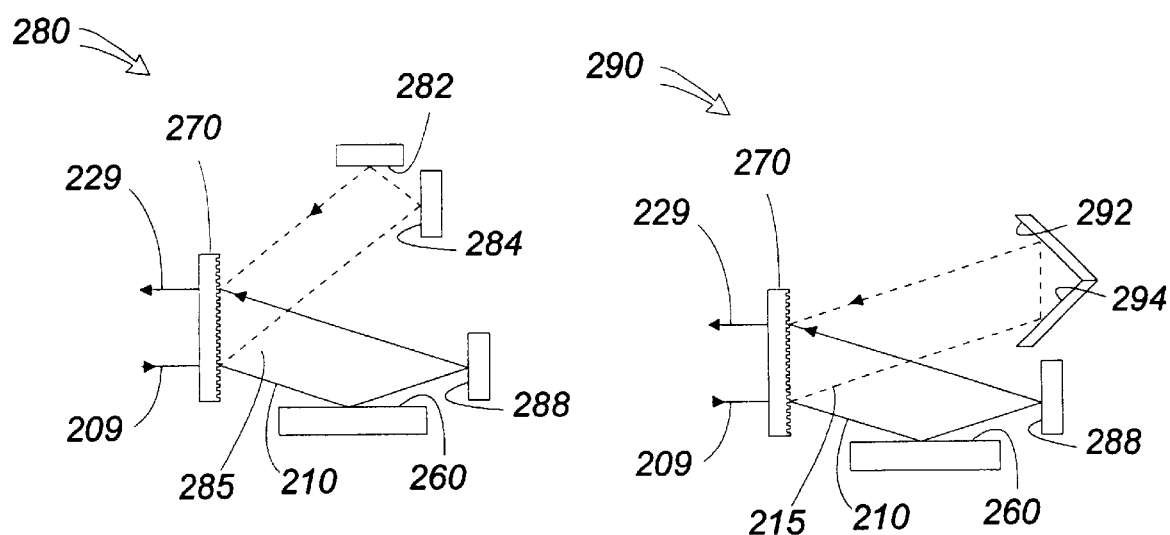
Figure 2B
Figure 2C

GRAZING INCIDENCE INTERFEROMETER AND METHOD

FIELD OF THE INVENTION

The invention relates generally to optical metrology instrumentation for imaging, analysis and characterization of surfaces, and more particularly, to grazing-incidence interferometers.

BACKGROUND OF THE INVENTION

Detecting surface defects and form errors with sizes in the micron range has become an important issue for contemporary part manufacturers. Contemporary parts often do not have highly polished surfaces and thus are not amenable to interferometric examination using visible light reflected at normal incidence. For such parts, grazing incidence interferometers may be useful measuring tools. These interferometers use light reflected off a surface at grazing angles to measure the surface's properties.

There are several known types of grazing incidence interferometers, as is described, for example, on pp. 76, 259–260 of the book "Optical shop testing" by D. Malacara, Second Edition (John Wiley & Sons, Inc., New York, 1992). The density of fringes generated by a grazing incidence interferometer having an illumination wavelength $\lambda$ is characterized by an equivalent wavelength $\Lambda$, given by the formula $$\Lambda = \lambda / \cos(\alpha) \quad (1)$$

Since the equivalent wavelength $\Lambda$ is larger than $\lambda$, many surface textures that are too rough for interferometry at the illumination wavelength $\lambda$ appear smoother when illuminated at grazing angles than when illuminated at normal incidence. It is consequently easier to perform interferometry at grazing incidence angles for these surfaces.

Various methods have been employed for separating and recombining measurement and reference wavefronts used for grazing incidence interferometry. Abramson, in Optik, 30, 56–71 (1969), describes a well-known type of grazing incidence interferometer that employs a large right-angle prism placed nearly in contact with a sample surface. In this case, the hypotenuse of the prism serves both to separate and to recombine the measurement and reference wavefronts.

Birch, in J. Phys. E: Sci. Instru. 6, 1045–1048 (1973), describes a grazing incidence interferometer that relies on diffraction gratings for separating and recombining the wavefront rather than the hypotenuse of a right-angle prism. Birch's interferometer has the advantage that the sample surface need not be placed close to optical components of the interferometer.

Although there are several types of grazing incidence interferometer in the prior art, including those cited above, grazing incidence interferometry has enjoyed only a limited success for on-line, production yield enhancement of precision manufactured surfaces. There is accordingly an unmet need for an accurate, efficient and convenient geometry for grazing incidence interferometry.

SUMMARY OF THE INVENTION

In accordance with a first embodiment of the invention, the interferometer includes a source, beam expansion optics that generate an initial illumination wavefront and a diffractive-optic beam splitter for separating the initial wavefront into a reference wavefront and a measurement wavefront by amplitude division. In some embodiments, the reference and measurement wavefronts correspond to the first-order diffracted beams of the diffractive-optic beam splitter.

The measurement wavefront reflects from the sample surface at a grazing angle. The interferometer also includes a diffractive-optic beam combiner to recombine the reference and measurement wavefronts into an output wavefront and an optical imaging system to generate an image of the sample surface containing interference fringe information from the output wavefront. Because the recombined reference and measurement wavefronts undergo the same number of inversions, they have the same relative relationship as they had when initially split from the initial illumination wavefront.

In various embodiments, the reference wavefront reflects from a reference mirror, generally disposed parallel to and facing the sample surface. Then, the reference and measurement wavefronts overlap after reflection.

In various embodiments, grazing incidence and reflection angles are angles of greater than 75° with respect to a normal to the sample surface.

In various embodiments, the splitter and recombiner are configured so that the equivalent wavelength $\Lambda$, which characterizes the interference fringes, is substantially independent of the source wavelength $\lambda$.

Various embodiments of the interferometer position optical elements so that optical path lengths traversed by the measurement and reference wavefronts are substantially equal. In some of these embodiments, the source includes a spectrally broadband source, such as, a multimode laser diode, a light emitting diode, filtered white light or another source of low-coherence light.

Various embodiments employ auxiliary mirrors, e.g., a reference mirror and a fold mirror. The fold mirror may be located to facilitate the forming the beam splitter and the beam combiner with a single diffractive-optic element.

Various embodiments perform phase shifting interferometry using electronic data acquisition, computer control and mechanical devices that introduce precise phase shifts in the interference pattern.

Various embodiments position optical elements and/or other devices so that the reference and measurement wavefronts traverse unequal path lengths. In these interferometers, the source wavelength may be a tunable laser light source that facilitates phase shifting.

Various embodiments are configured to simultaneously measure the front and back surfaces of a sample. Some such embodiments can determine the thickness profile of a silicon wafer.

Various embodiments are adapted for the analysis of non-planar surfaces, e.g., cylinders.

In various embodiments, the diffractive-optics causes the reference wavefront to converge to a focus and then to diverge while propagating between the beam splitter and beam combiner. The propagation inverts the reference wavefront.

Various embodiments restrict the sample height range over which high-contrast fringes form in the image of the sample surface. Some such interferometers employ an extended source, that is, a source having a large surface area, such as a ground glass screen illuminated by a laser beam or a light-emitting diode. These interferometers further include data acquisition devices, a computer control and a mechanical actuator to scan the interference pattern by moving the sample in a direction substantially perpendicular to the sample surface. Such embodiments can profile the sample surface without the fringe ambiguity by using fringe-contrast scanning.

Various embodiments of the invention employ birefringent optical elements in place of the diffractive-optic elements.

BRIEF DESCRIPTION OF THE DRAWINGS

The above described and other features of the invention are made more apparent in the ensuing detailed description and drawings, wherein like reference characters denote similar elements throughout the several views:

FIG. 2A is a second embodiment of a grazing incidence interferometer including a fold mirror;

FIGS. 2B and 2C are alternate embodiments of the grazing incidence interferometer of FIG. 2A.

DETAILED DESCRIPTION OF THE PREFERRED EMBODIMENTS

Various embodiments include two-beam interferometers that illuminate a sample surface with light at grazing incidence angles for the purpose of analyzing a characteristic of a sample surface. Some of the interferometers include diffractive-optics, e.g., linear transmission gratings, for splitting an initial illumination wavefront into a reference wavefront and a measurement wavefront by amplitude division. Amplitude division is described in more detail by "Basics of Interferometry" by P. Hariharan, Academic Press, Inc, Boston, 1992, pages 16–17. The measurement beam undergoes a single reflection at the sample surface. The interferometers also include a wavefront combiner to produce an output wavefront by interfering portions of the reference wavefront and measurement wavefronts. An optical imaging system processes the output wavefront to focus an image of the sample surface, e.g., on a viewing screen or an electronic camera. The image may have interference fringes characterized by an equivalent wavelength $\Lambda$ and related to the topography of the sample surface.

The elements of the interferometers are arranged so that those portions of the reference wavefront and the measurement wavefront that interfere originate from substantially the same portion of the initial illumination wavefront. First, the reference and measurement wavefronts have the same relative relationship at recombination that they had at the original splitting of the initial illumination wavefront, i.e., the wavefronts are not inverted with respect to each other. Second, over the entire wavefront being recombined, each portion of reference wavefront and associated portion of the measuring wavefront come from substantially the same portion of the initial illumination wavefront. Here, the recombined portions of the wavefronts may come from slightly different portions of the initial wavefront due to minor defects, e.g., misalignments in optical components, irregularities in the sample surface, etc.

This characteristic makes the invention substantially insensitive to the quality of the initial illumination wavefront. Thus, collimation errors, aberrations, spatial incoherence and temporal incoherence in the initial illumination wavefronts generate, at most, weak effects on the interference fringes in the output wavefront. Furthermore, defects in the flatness of the diffractive-optics generate, at most, weak effects on the interference fringes produced by the reference and measurement beams. The embodiments nonetheless retain advantages of using diffractive-optics for grazing incidence interferometry. For example, the sample surface need not be placed close to any optical component of the interferometer. The wavefront splitting and recombining optics may have substantially smaller apertures than the dimensions of the sample surface. For example, the area of the splitter or combiner may be smaller than about ¼ of the area of the sample surface.

Figure 1:
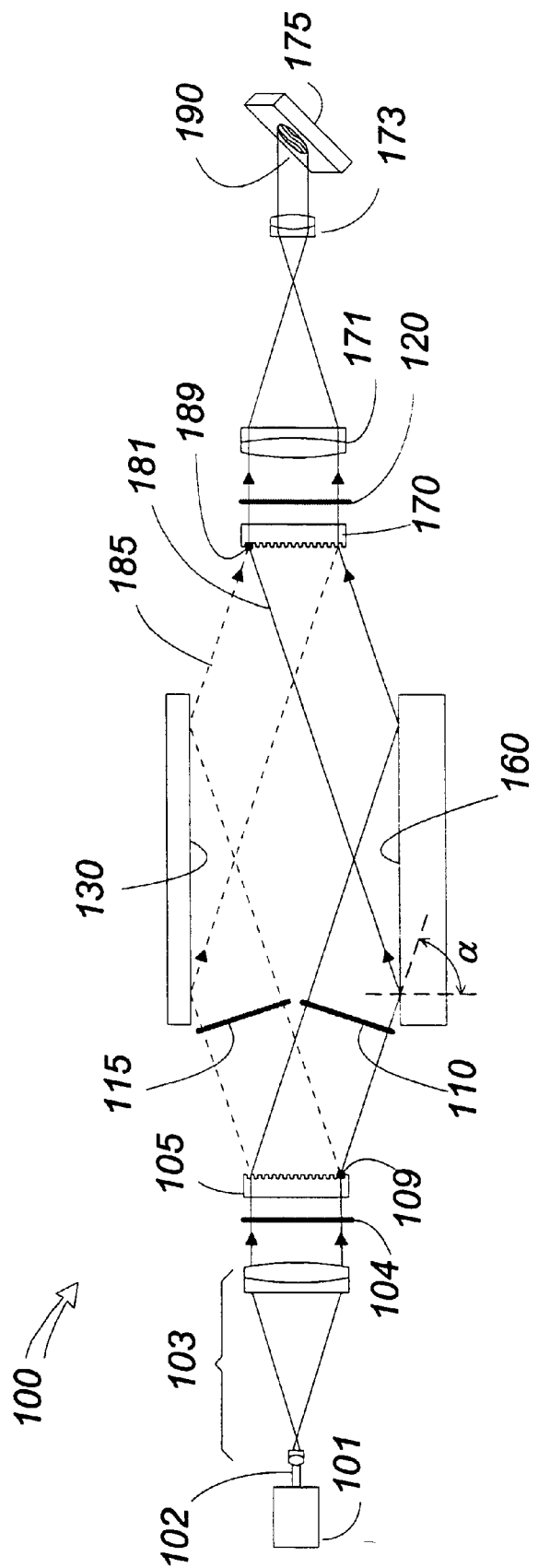
FIG. 1 is a first embodiment of a grazing incidence interferometer employing diffractive-optics.

FIG. 1 illustrates an embodiment of a grazing incidence interferometer 100 arranged for analyzing a sample surface 160. A light source 101, which may for example be a lamp, a light-emitting diode, a multimode laser diode or a gas laser generates a beam 102. After passing through expansion optics 103, the beam 102 produces an initial illumination wavefront 104. A diffractive-optic beam splitter 105, which may be for example a linear phase grating with zero-order suppression, separates initial illumination wavefront 104 into a reference wavefront 115 and a measurement wavefront 110. The two wavefronts 115 and 110 come from opposite grating orders, e.g., ±1, and consequently travel in divergent directions. Reference wavefront 115 reflects once from reference mirror 130 prior to traveling to a diffractive-optic beam combiner 170, which may be similar to diffractive-optic beam splitter 105. Reference mirror 130 is either optically flat, e.g., to about ¹⁄₁₅ of the wavelength or has a known surface shape. Measurement wavefront 110 reflects from sample surface 160, at a grazing angle a, and then travels to diffractive-optic beam combiner 170 where it recombines with the reference wavefront 115 to form an output wavefront 120. Output wavefront 120 travels through a lens 171 and an imaging lens 173 to a viewing screen 175 where an image 190 of sample surface 160 forms. Viewing screen 175 is inclined obliquely to reduce foreshortening in image 190 caused by imaging sample surface 160 at grazing angle $\alpha$. Image 190 contains interference fringe information related to the topography of sample surface 160, which may be interpreted by methods known in the art. In such interpretations the equivalent wavelength relevant to these fringes is given by Eq. (1).

The term "diffractive-optic", as used herein, is intended to include diffraction gratings, binary optics, surface-relief diffractive lenses, holographic optical elements, and computer-generated holograms. These devices can function in transmission or in reflection as beam splitters and combiners. They may suppress unwanted diffraction orders, e.g., the zero'th order transmission, so as to reduce scattered light and improve efficiency. Methods of fabricating diffractive-optical devices include diamond machining, coherent beam interference (holography), injection molding, and advanced micro-lithographic techniques. Diffractive-optics are recognized by those skilled in the art as distinct from refractive and reflective optical elements such as lenses, prisms, mirrors and plate beam splitters.

When measurement wavefront 110 and reference wavefront 115 come together to form output wavefront 120, overlapping portions of measurement wavefront 110 and reference wavefront 115 originate from substantially the same portion of initial illumination wavefront 104. For example, a reference ray 185 and a measurement ray 181 recombining at a point 189 on diffractive-optic beam combiner 170 originate substantially from the same point 109 on diffractive-optic beam splitter 105. As a consequence, aberrations or spatial incoherence in initial illumination wavefront 104 generate, at most, weak effects on the interference fringes observed in image 190. As a further consequence, small defects in beam expansion optics 103 or distortions resulting from air turbulence produce, at most, weak effects on the analysis of image 190. As a further consequence, deviations from flatness in the diffractive-optic beam splitter 105 or the diffractive-optic beam combiner 170 generate, at most, weak effects on the interference fringes observed in image 190.

An additional characteristic of this first embodiment is that equivalent wavelength $\Lambda$ is substantially independent of the wavelength $\lambda$ of source 101. This may be understood as follows. From the geometry of the interferometer 100 and well-known properties of diffraction gratings, it can be shown that the angle of incidence $\alpha$ in this first embodiment is given by:

$$\cos(\alpha) = \lambda/D \quad (2)$$

Here, D is the grating pitch, i.e., the linear separation between grating lines, of the diffractive-optic beam splitter 15 105 and the diffractive-optic beam combiner 170. By combining Eqs.(1) and (2), one finds that in this first embodiment:

$$\Lambda = D. \quad (3)$$

Thus, different source wavelengths $\lambda$ produce the same equivalent wavelength $\Lambda$, which is equal to the grating pitch.

An additional characteristic of this first embodiment is that the optical path traversed by measurement wavefront 110 is substantially equal to the optical path traversed by reference wavefront 115. This facilitates the use of multimode laser diodes or other spectrally broadband devices, e.g., wavelength range >0.1 nm, for source 101. The use of spectrally broadband devices can improve the quality of image 190, by reducing the effects of spurious fringe patterns and speckle noise characteristic of single-mode lasers or other high-coherence spectrally narrow-band or monochromatic devices, e.g., wavelength range <0.1 nm, when used as sources for interferometry. The substantial equality of the optical paths traversed by the wavefronts 115 and 110 also desensitizes this first embodiment to instability in the wavelength of source 101, which might otherwise be a problem for laser diodes, which can oscillate between lasing modes unexpectedly.

Still referring to FIG. 1, the interferometer 100 provides a large working distance to the sample surface 160. Working distance refers to the distance between a sample surface and the closest optical component. The large working distance in grazing incidence interferometer 100 means that sample surface 160 can be conveniently positioned without concern for possible damage to sample surface 160 or any component of grazing incidence interferometer 100. This characteristic of the interferometer 100 may be advantageous for automated parts handling.

In FIG. 1, both diffractive-optic beam splitter 105 and diffractive-optic combiner 170 are oriented substantially perpendicular to sample surface 160. Furthermore, initial illumination wavefront 104 is substantially perpendicular diffractive-optic beam splitter 105. This geometry fixes the equivalent wavelength $\Lambda$ for the interferometer 100.

Other embodiments obtain different equivalent wavelengths $\Lambda'$ through small changes in the geometry of the interferometer 100. For example, changing the incident angle of initial illumination wavefront 104 with respect to diffractive-optic beam splitter 105, and accommodating the resultant change in exit angle for output wavefront 120, changes incident angle $\alpha$ on the sample surface 160. This, in turn, changes the value of the equivalent wavelength $\Lambda'$ to have greater or lesser value than that of Eq. (3), and can provide multiple equivalent wavelengths for the grating pitch D of diffractive-optic beam splitter 105 and diffractive-optic beam combiner 170.

FIG. 2A, shows an embodiment of a grazing incidence interferometer 200 arranged for analyzing a sample surface 260. The interferometer employs a fold mirror 231 to achieve an overall compact size of grazing incidence interferometer 200 while retaining the aforementioned benefits of the interferometer 100. A light source 201 generates an expanding beam 202, which after reflection from a source mirror 203, is collimated by lens 205 to produce an initial illumination wavefront 204. An initial illumination ray 209 generates a portion of wavefront 204. A diffractive-optic beam element 270 separates initial illumination ray 209 into a reference ray 215 and a measurement ray 210, respectively. Reference ray 215 and measurement ray 210 correspond to different grating orders, e.g., ±1, and consequently travel in divergent directions. Reference ray 215 reflects first from fold mirror 231 and then from a reference mirror 230. Measurement ray 215 reflects first from sample surface 260, at a grazing incidence angle and then from fold mirror 231. Diffractive-optic beam element 270 recombines reference ray 215 and measurement ray 210 into an output ray 229 to produce a portion of output wavefront 220. Output wavefront 220 travels through lens 205 and an imaging lens 295 to a viewing screen 275 where an image 290 of sample surface 260 forms.

FIG. 2B shows an alternate embodiment 280 of the grazing incidence interferometer 200 of FIG. 2A. Here, beam splitter 270 is a diffraction grating. The interferometer 280 uses two small mirrors 282 and 284 arranged to form a right angle corner mirror. The two mirrors 282 and 284 redirect the reference ray 285, which comes from the +2 diffraction order of beam splitter 270, back towards the beam splitter 270. A separate small mirror 288 redirects the reflected measuring ray 210, which comes from the -1 diffractive order of the beam splitter 270, back towards the beam splitter 270. The two mirrors 282 and 284 may be less costly to construct than the reflector 230 of FIG. 10, because of their smaller size.

FIG. 2C shows another alternate embodiment 290 of the interferometer 200 of FIG. 2A. This embodiment is similar to the embodiment of FIG. 2B in that beam splitter 270 is a diffraction grating. Two small mirrors 292 and 294, arranged to form a right angle corner mirror, redirect the reference ray 215 produced from the +1 diffraction order of the beam splitter 270 back towards the beam splitter 270. The positions of the mirrors 288, 292, and 294 ensure that corresponding rays 215 and 210 of measuring and reference beams have paths, in the interferometer 290, which are within several λ's of each other in length. Again, the two mirrors 292 and 294 may be less costly to construct than the reflector 230 of FIG. 2A if the reflector 230 has a large surface area.

Figure 3:
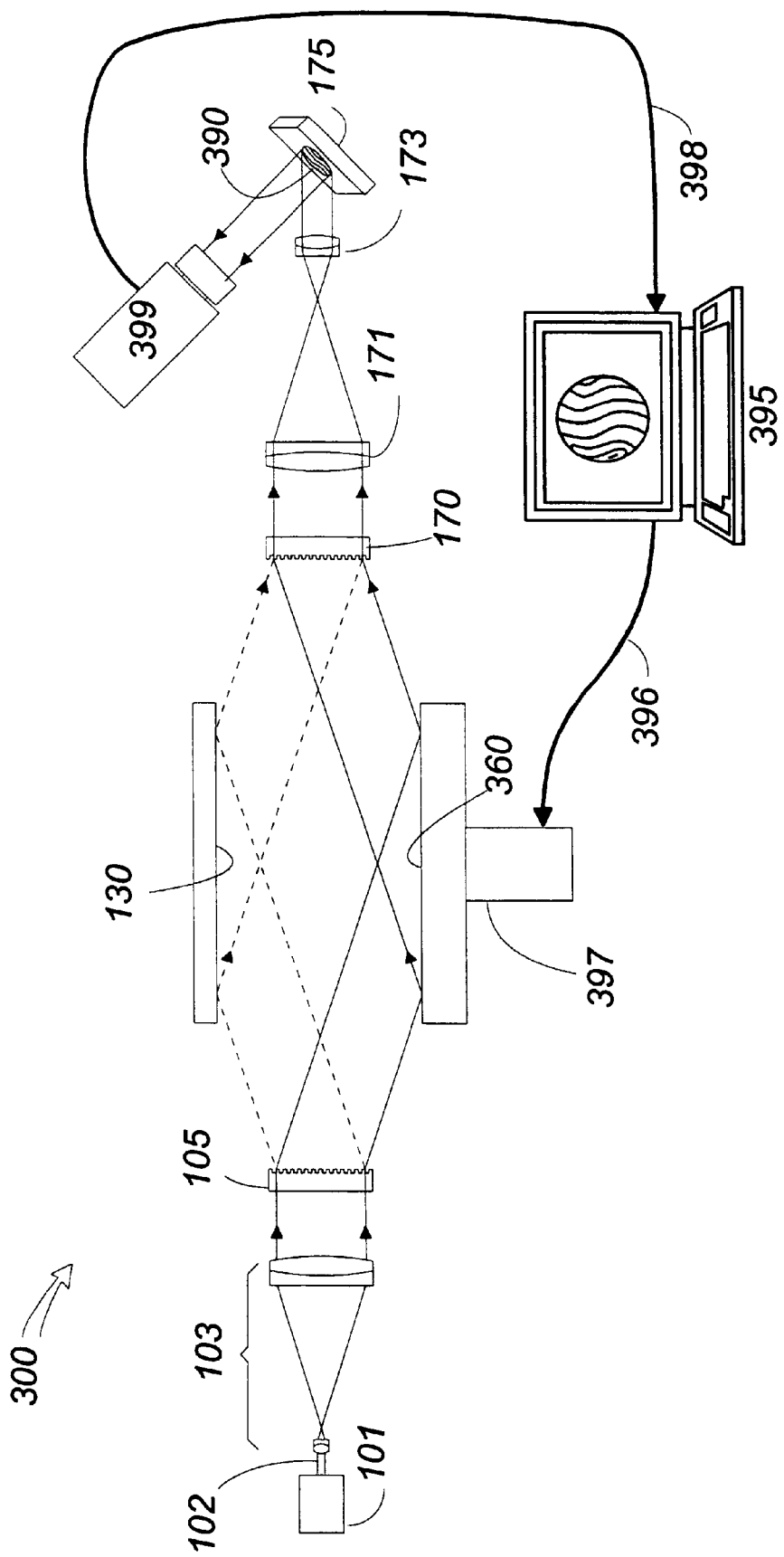
FIG. 3 is a third embodiment of a grazing incidence interferometer including electronic control, imaging, and data acquisition and interpretation systems.

FIG. 3, shows an embodiment of grazing incidence interferometer 300 similar to the interferometer 100 of FIG. 1, but equipped with an actuator 397, an electronic camera 399 and a computer 395 for performing phase-shifting interferometry (PSI). The computer 395 instructs actuator 397 via cable 396 to displace sample surface 360 in a direction substantially perpendicular to sample surface 360, over a distance on the order of one or two equivalent wavelengths. The computer 395 may operate a piezo-electric crystal or an acousto-optic modulator in the actuator to cause the displacement. The displacements of sample surface 360 result in an interference fringe shift in image 390. During this interference fringe shift, electronic camera 399, which views image 390, transmits to computer 395 a sequence of electronic images via a cable 398. Computer 395 stores these electronic images and subsequently analyzes the stored electronic images to extract interference phase information using well-known PSI techniques.

It will be evident to those skilled in the art that an actuator similar to actuator 397 may be employed to displace a component of grazing incidence interferometer 300 rather than sample surface 360. For example, a displacement of reference mirror 130 will result in an interference fringe shift, as would a displacement of diffractive-optic beam combiner 170.

Figure 4:
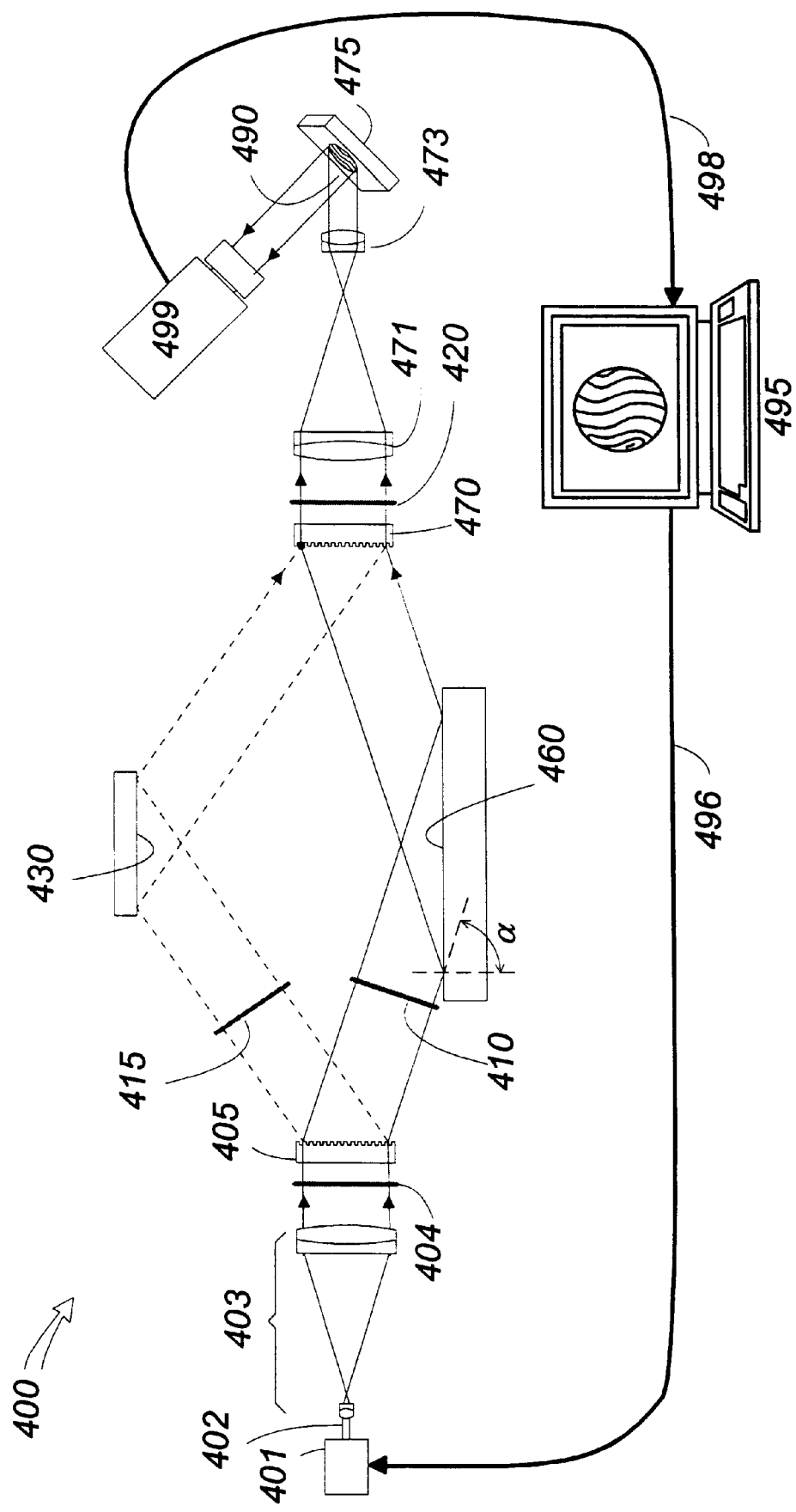
FIG. 4 is a fourth embodiment of a grazing incidence interferometer employing unequal measurement and reference paths and a tunable laser source.

FIG. 4, shows an embodiment of a grazing incidence interferometer 400 for analyzing a sample surface 460 by means of wavelength-tuned PSI. A wavelength-tunable light source 401, which may for example be a current-tuned laser diode, a temperature tuned laser diode or a grating-tuned laser diode, generates a beam 402 of adjustable wavelength λ. Beam 402 passes through expansion optics 403 and produces an initial illumination wavefront 404. A diffractive-optic beam splitter 405 separates initial illumination wavefront 404 into a reference wavefront 415 and a measurement wavefront 410. The wavefronts 415 and 410 come from different grating orders, e.g., the +2 and −1 orders respectively, and consequently travel in divergent directions and at different angles with respect to diffractive-optic beam splitter 405. Reference wavefront 415 reflects once from a reference mirror 430, which may have a substantially smaller area than sample surface 460, prior to traveling to a diffractive-optic beam combiner 470. Measurement wavefront 410 reflects once from a sample surface at a grazing angle α and then travels to diffractive-optic beam combiner 470. The combiner 470 recombines the wavefronts 415 and 410 to form an output wavefront 420. Output wavefront 420 travels through a lens 471 and an imaging lens 473 to a viewing screen 475 to form an image 490 of sample surface 460.

The optical path traversed by measurement wavefront 410 has a different length than the length the optical path traversed by reference wavefront 415. Denoting the difference in path length as L, the phase of the interference fringe pattern in image 490 changes by an amount Δφ given by:

$$\Delta\phi = 2\pi L \Delta\lambda / \lambda^2 \qquad (4)$$

Therefore, one way to shift the phase of the interference fringes appearing in image 490 is to shift the wavelength λ of source 401.

According to one method, computer 495 instructs source 401 via cable 496 to effect a change Δλ in source wavelength λ so as to introduce a phase shift Δφ of approximately 2π in the interference fringes appearing in image 490. During this interference fringe shift, electronic camera 499, which views image 490, transmits to computer 495 a sequence of electronic images via a cable 498. Computer 495 stores these electronic images and subsequently analyzes the stored electronic images to extract interference phase information using any of the well-known PSI techniques.

Figure 5:
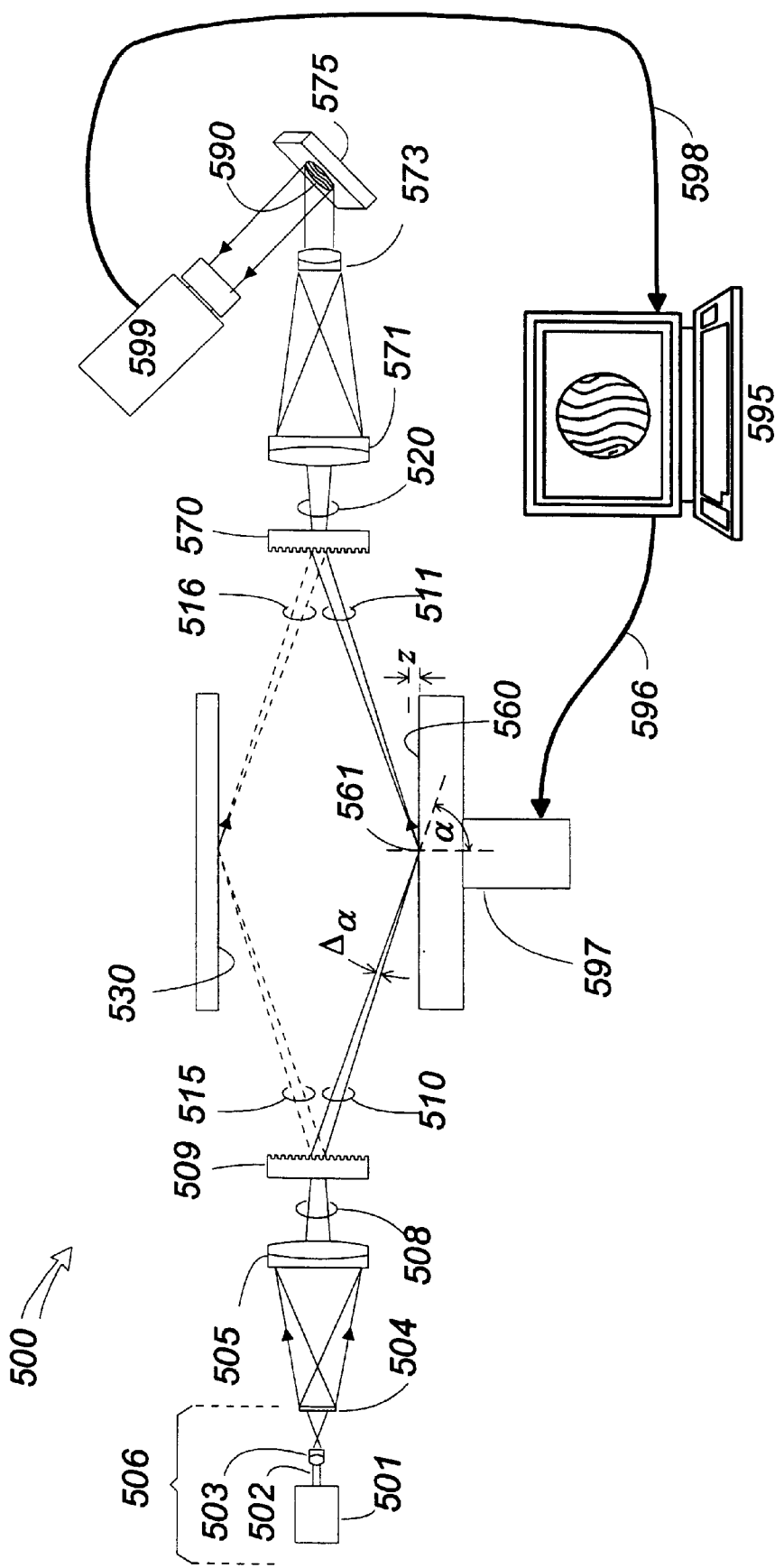
FIG. 5 is a fifth embodiment of a grazing incidence interferometer, in which an extended source is employed to restrict the height range over which one observes high-contrast fringes on the sample surface.

FIG. 5, shows an embodiment of grazing incidence interferometer 500 for analyzing a sample surface 560 by means of fringe-contrast scanning. Grazing incidence interferometer 500 is arranged so as to limit the height range of interference effects. That is, the contrast of the interference fringes in the image 590 generated by grazing incidence interferometer 500 depends strongly on the position z of sample surface 560 and on the topography of sample surface 560. Restriction of the range of interference effects is achieved by employing an extended source, that is, a source having a large surface area.

An extended source 506 includes a source 501, which generates a beam 502. After passing through a diverging lens 503, the beam 502 illuminates a ground glass screen 504. A collimating lens 505 forms an initial illumination wavefront (not shown) and an initial illumination ray bundle 508.

Initial illumination ray bundle 508 includes both parallel light rays and light rays traveling in convergent directions because of the extended nature of source 506. A diffractive-optic beam splitter 509 separates initial illumination ray bundle 508 into a measurement ray bundle 510 and a reference ray bundle 515. Reference ray bundle 515 travels to a reference mirror 530 and leaves as a reflected reference ray bundle 516. Measurement ray bundle 510 converges to and reflects from a measurement point 561 on sample surface 560 to produce a reflected measurement ray bundle 511. The angle of incidence of measurement ray bundle 510 is α±Δα/2 Reflected measurement ray bundle 511 travels to a diffractive-optic beam combiner 570, where it recombines with reflected reference ray bundle 516 to form an output ray bundle 520. A lens 571 and an imaging lens 573 project an image 590 of sample surface 560 onto a viewing screen 575. The image 590 includes interference fringe information related to a characteristic of sample surface 560.

Still referring to FIG. 5, computer 595 instructs a long-range actuator 597 via cable 596 to displace sample surface 560 in a direction substantially perpendicular to sample surface 560. The displacement range z encompasses, at least, the entire range of heights of sample surface 560 within a field of view that is of interest. During this displacement of sample surface 560, an electronic camera 599, which is viewing image 590, transmits to computer 595, via a cable 598, a sequence of electronic images. These electronic images are stored in computer 595. Displacement of sample surface 560 results in a scan-dependent interferogram for each pixel of electronic camera 599. Computer 595 subsequently analyzes the stored electronic images to extract a characteristic of sample surface 560, such as the surface topography.

Still referring to FIG. 5, the angle of incidence of measurement ray bundle 510 includes a range of angles α±Δα/2

Therefore, image 590 contains overlapping interference fringe patterns for a range of equivalent wavelengths $\Lambda\pm\Delta\Lambda/2$. These overlapping interference fringe patterns produce high-contrast fringes only for a narrow range of positions of sample surface 560.

Figure 6:
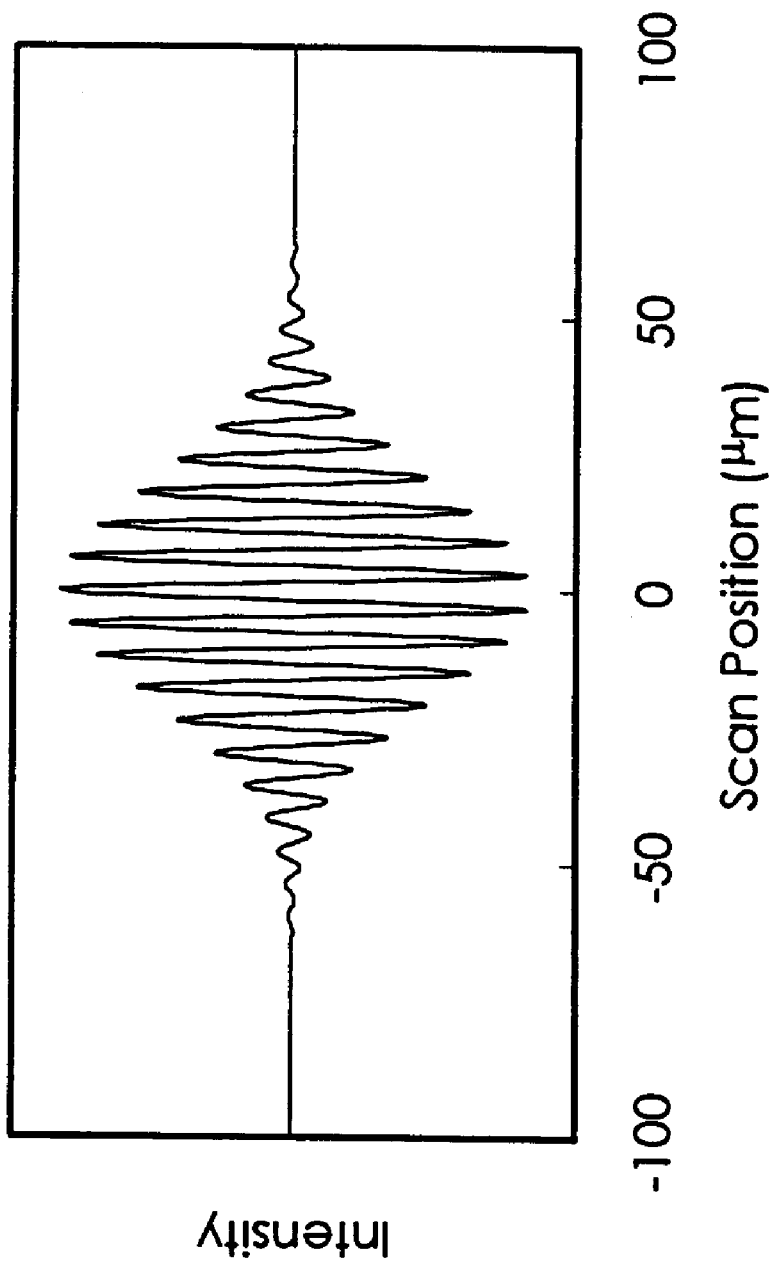
FIG. 6 is a graph of contrast variations of interference fringes for the fifth embodiment shown in FIG. 5.

FIG. 6, shows a scan-dependent interferogram as a function of the mechanical displacement z of sample surface 560 shown in FIG. 5. The intensity corresponds to a single image point or pixel.

Several methods of analyzing scan-dependent interferograms are known in the art. One method involves measuring the strength of the oscillatory signal of the scan-dependent interferogram as a function of z. The scan position z for peak strength depends on the height, e.g., of point 561 as shown in FIG. 5, on sample surface. This method enables measuring large variations in surface topography without fringe ambiguities characteristic of conventional PSI. Alternatively, a second method performs frequency-domain analysis, according to principles taught in the U.S. Pat. No. 5,398,113, assigned to the same assignee as the present application, and incorporated herein by reference in its entirety.

Figure 7:
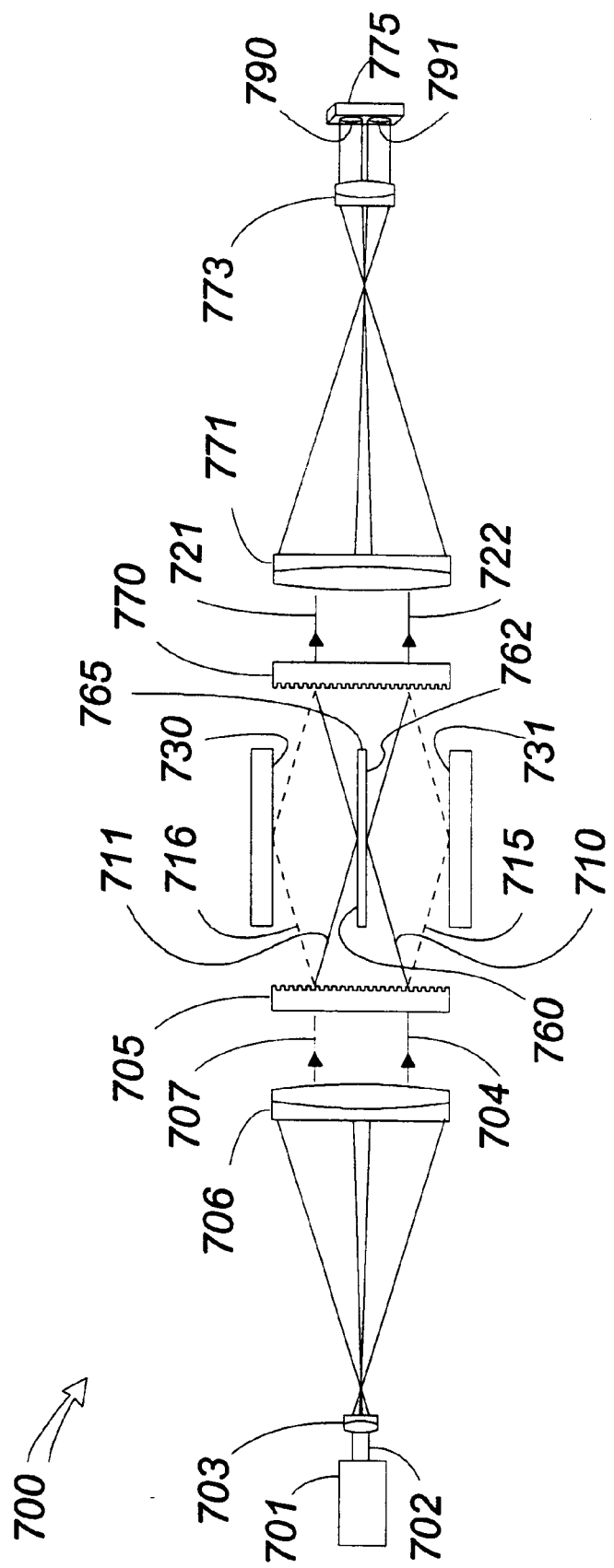
FIG. 7 is a sixth embodiment of a grazing incidence interferometer capable of simultaneously measuring front and back surfaces of a sample object.

FIG. 7, shows an embodiment of a grazing incidence interferometer 700 for analyzing a first sample surface 760 and a second sample surface 762. A light source 701 generates a beam 702 that passes through a source lens 703. A collimating lens 706 generates a first initial illumination wavefront (not shown), a portion of which produces a first illumination ray 707, and a second initial wavefront (not shown), a portion of which produces a second illumination ray 704. A diffractive-optic beam splitter 705 separates first illumination ray 707 into a first reference ray 716 and a first measurement ray 711. Diffractive-optic beam splitter 705 also separates second initial illumination ray 704 into a second reference ray 715 and a second measurement ray 710. First reference ray 716 and second reference ray 715 reflect from a first reference mirror 730 and a second reference mirror 731, respectively, prior to traveling to a diffractive-optic beam combiner 770. First measurement ray 711 reflects from a first sample surface 760, prior to traveling to diffractive-optic beam combiner 770 to recombine with first reference ray 716 to form a first output ray 721. Similarly, second measurement ray 710 reflects from a second sample surface 762, prior to traveling to diffractive-optic beam combiner 770, to recombine with second reference ray 716 to form a second output ray 721.

A lens 771 and an imaging lens 773 together form a first image 791 and a second image 790 of first sample surface 760 and second sample surface 762, respectively, on a viewing screen 775. First image 791 and second image 790 contain interference fringe information related to the surface topography of first sample surface 760 and second sample surface 762, respectively. The fringe information may be interpreted by known methods which include the PSI techniques and associated apparatus enhancements discussed in conjunction with the fourth embodiment (FIG. 4) and the fringe contrast scanning techniques and associated apparatus enhancements discussed in conjunction with the fifth embodiment (FIG. 5). The first sample surface 760 and second sample surface 762 may be the front and back surfaces of a single sample object 765, as is indicated by FIG. 7. Then, the grazing incidence interferometer 700 provides an apparatus for determining the thickness profile of sample object 765.

Figure 8:
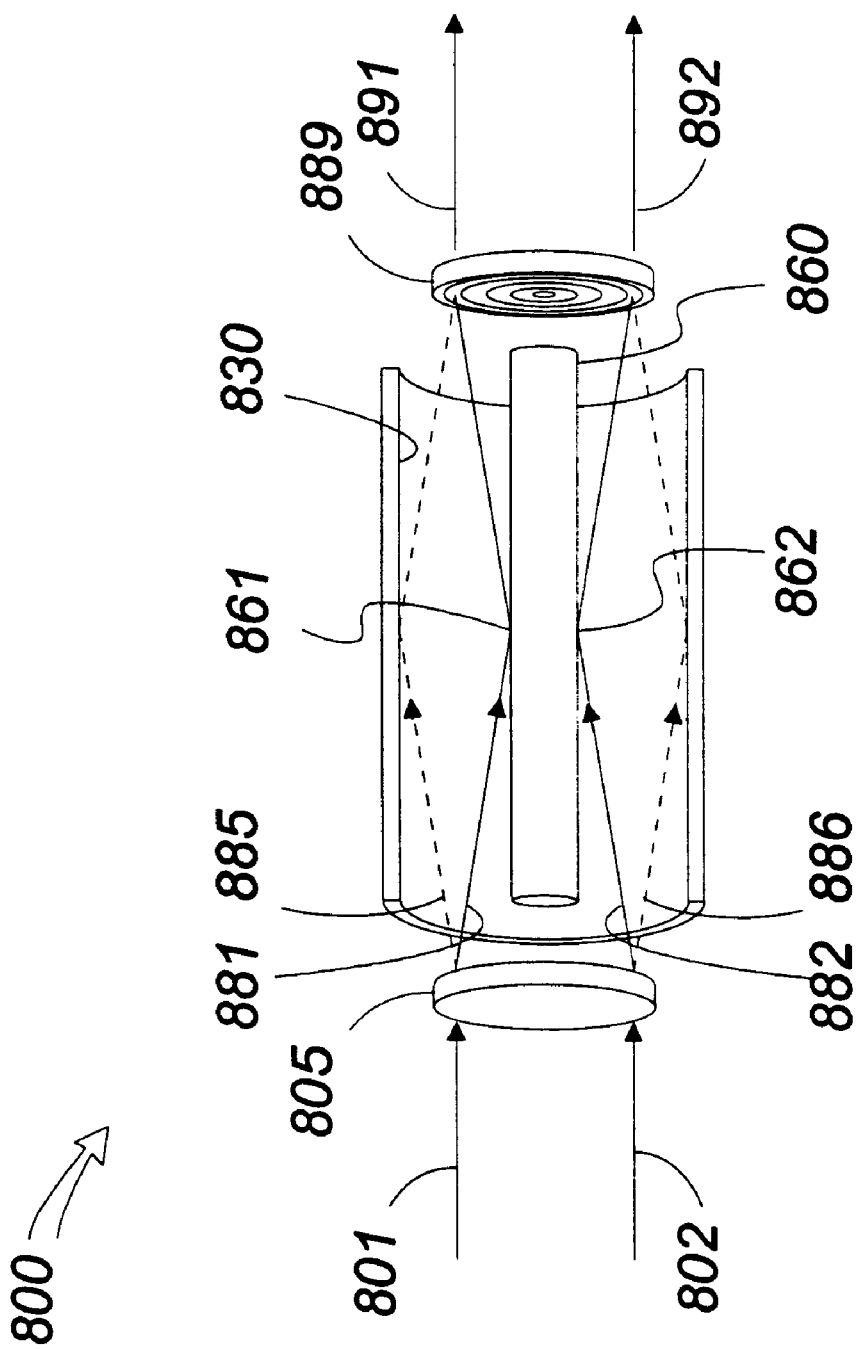
FIG. 8 is a seventh embodiment of a grazing incidence interferometer for measuring cylindrical sample surfaces.

Instead of measuring flatness or thickness, some embodiments gage diameters. FIG. 8, shows an embodiment of a grazing incidence interferometer 800 for analyzing a cylindrical sample surface 860. An initial illumination wavefront (not shown), the propagation path of which is represented by a first illumination ray 801 and a second illumination ray 802, impinges upon a diffractive-optic beam splitter 805. The diffractive-optic beam splitter 805 is a circularly engraved axicon grating, which generates a reference wavefront (not shown) in the form of an annulus having a diverging radius, and an annular measurement wavefront (not shown) having a converging radius. The path of the reference wavefront is represented by a first reference ray 885 and a second reference ray 886, corresponding to first illumination ray 801 and second illumination ray 802, respectively. The path of the measurement wavefront is represented by a first measurement ray 881 and a second measurement ray 882, corresponding to first illumination ray 801 and second illumination ray 802, respectively.

First reference ray 885 and second reference ray 886 each reflect once from a cylindrical reference mirror 830. Cylindrical reference mirror 830 is of high quality, for example a precision ring gauge, has a nearly perfect cylindrical surface profile and is concentric with the cylindrical sample surface 860. First measurement ray 881 and second measurement ray 882 each reflect once from cylindrical sample surface 860 at a first position 861 and a second position 862, respectively. Subsequently, first measurement ray 881 recombines with first reference ray 885 at a diffractive-optic beam combiner 889 to form a first output ray 891. The combiner 889 is the same type of device as diffractive-optic beam splitter 805, e.g., a circularly engraved axicon grating. Similarly, second measurement ray 882 recombines with second reference ray 886 to form a second output ray 892. First output ray 891 and second measurement ray 882 have interference information that encodes information on sample surface 860, e.g., information on the width of the surface 860 at point 861 and point 862, respectively.

The interference information may be interpreted by known methods in the art. These methods include the PSI techniques and associated apparatus enhancements discussed in conjunction with the interferometer 400 of FIG. 4 and the fringe contrast scanning techniques and associated apparatus enhancements discussed in conjunction with the interferometer 500 of FIG. 5. By appropriately projecting multiple rays, such as first output ray 891 and second measurement ray 882, onto a viewing screen or an electronic imaging device (both not shown), one may infer details of sample surface 860 such as cylindricity, diameter and straightness.

The embodiments discussed thus far reflect the reference wavefront from a reference mirror to cause an inversion so that the reference and measurement wavefronts are not mutually inverted after inversion of a measurement wavefront upon reflection from a sample surface. In general, the reference wavefront must undergo the same number of inversions, modulo two, about the same axis, e.g., an axis parallel to a sample surface, as the measurement wavefront. Thus, the reference wavefront may undergo one inversion and the measurement wavefront three inversions and still be mutually non-inverted.

The invention may employ fewer or more auxiliary mirrors, e.g., reference mirrors and/or fold mirrors, disposed in various locations and at various angles, to achieve an equal number, modulo two, of wavefront inversions. However, other methods for inverting the wavefront of the reference beam may achieve the absence of relative wavefront inversion between the measurement and reference beams without departing from the spirit of the invention. For example, wavefront inversion may result from the propagation of a non-planar wavefront.

Figure 9:
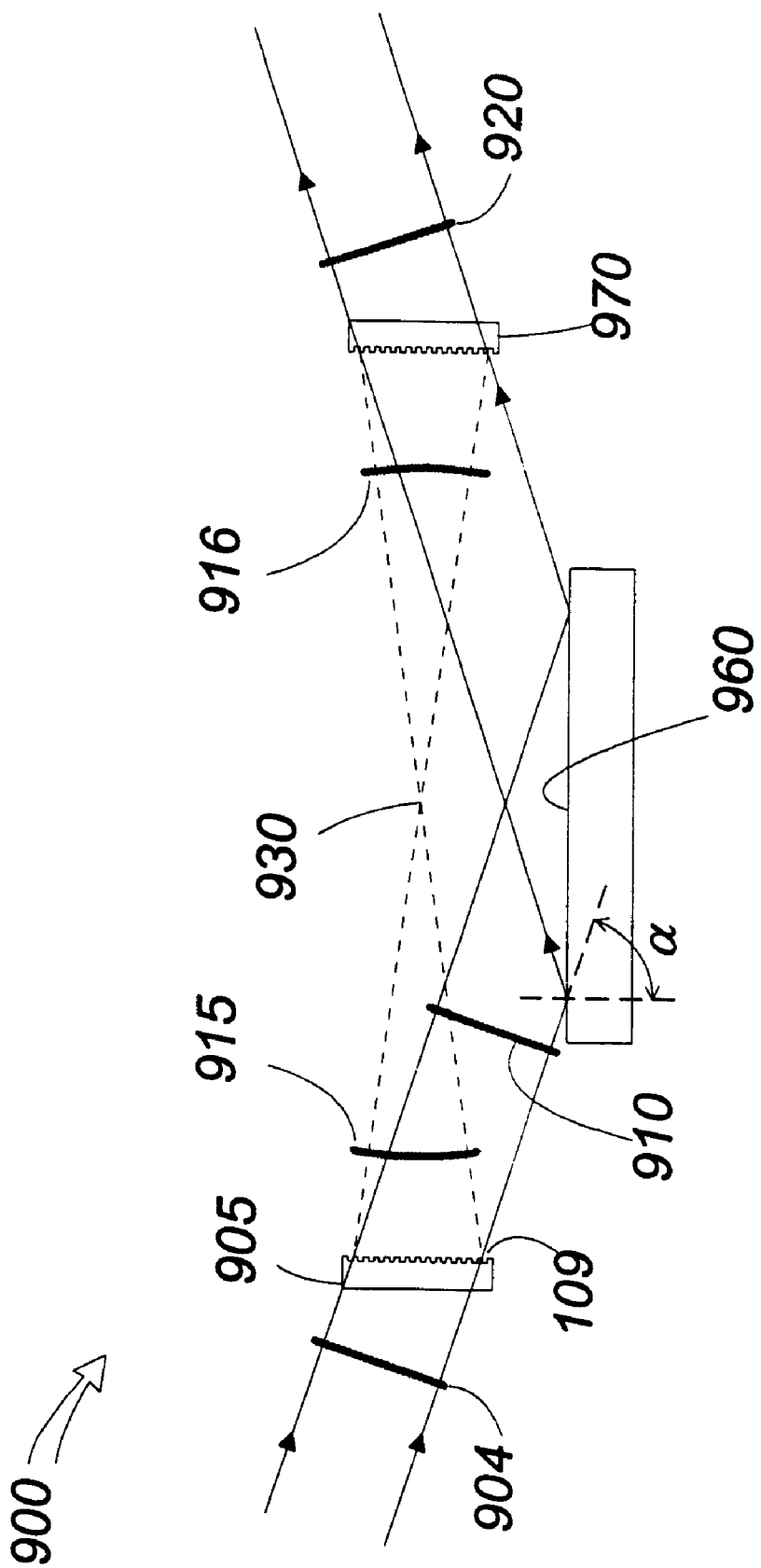
FIG. 9 is a eighth embodiment of a grazing incidence interferometer, in which the reference wavefront is inverted, while propagating between the beam splitter and beam combiner without a reflection.

FIG. 9, shows an embodiment of a grazing incidence interferometer 900, which does not rely on a reference mirror to invert the wavefront of the reference beam. A diffractive-optic beam splitter 905 separates an initial illumination wavefront 904 into a converging reference wavefront 915 and a planar measurement wavefront 910. Converging reference wavefront 915 is the result of first-order diffraction and has a cylindrical form. The reference wavefront 915 passes through a focus 930 and becomes a diverging reference wavefront 916. Measurement wavefront 910 is a zero-order transmission beam of the splitter 905. Diffractive-optic beam splitter 905 may be a hologram, binary optic or similar device that generates a converging cylindrical wavefront in the nonzero diffraction orders. For example, the beam splitter 905 may include parallel linear features having an unequal grating pitch. Measurement wavefront 910 reflects once from a sample surface 960 at a grazing angle a and then travels to a diffractive-optic beam combiner 970, where it recombines with diverging reference wavefront 916 to form output wavefront 920. Diffractive-optic beam combiner 970 is of the same type as diffractive-optic beam splitter 905, e.g., a hologram, binary optic or similar device that collimates a diverging cylindrical wavefront into a first-order diffracted plane wavefront. Output wavefront 920 has interference fringe information about sample surface 960, e.g., surface topography information, which may be recovered in a number of ways known in the art.

When measurement wavefront 910 and diverging reference wavefront 916 recombine to form output wavefront 920, overlapping portions of measurement wavefront 910 and diverging reference wavefront 916 originate from substantially the same portion of initial illumination wavefront 904. This is due, in part, to the inversion of converging reference wavefront 915 as it passes through focus 930 and becomes diverging reference wavefront 916. This inversion ensures that the recombined reference and measurement beams have the same relative wavefront orientations at the combiner 970. As a consequence, aberrations or spatial incoherence in initial illumination wavefront 904 generate, at most, weak effects on the interference fringes observed in image 990.

Although the above-described embodiments rely on diffractive-optics for beam separation and recombination, alternative methods and apparatus for beam separation and recombination may be employed without departing from the spirit of the invention. As an example, FIG. 10 shows an embodiment of a grazing incidence interferometer 1000, similar to the interferometer 100 shown in FIG. 1, but employing birefringent crystals in place of the diffractive-optic elements.

Figure 10:
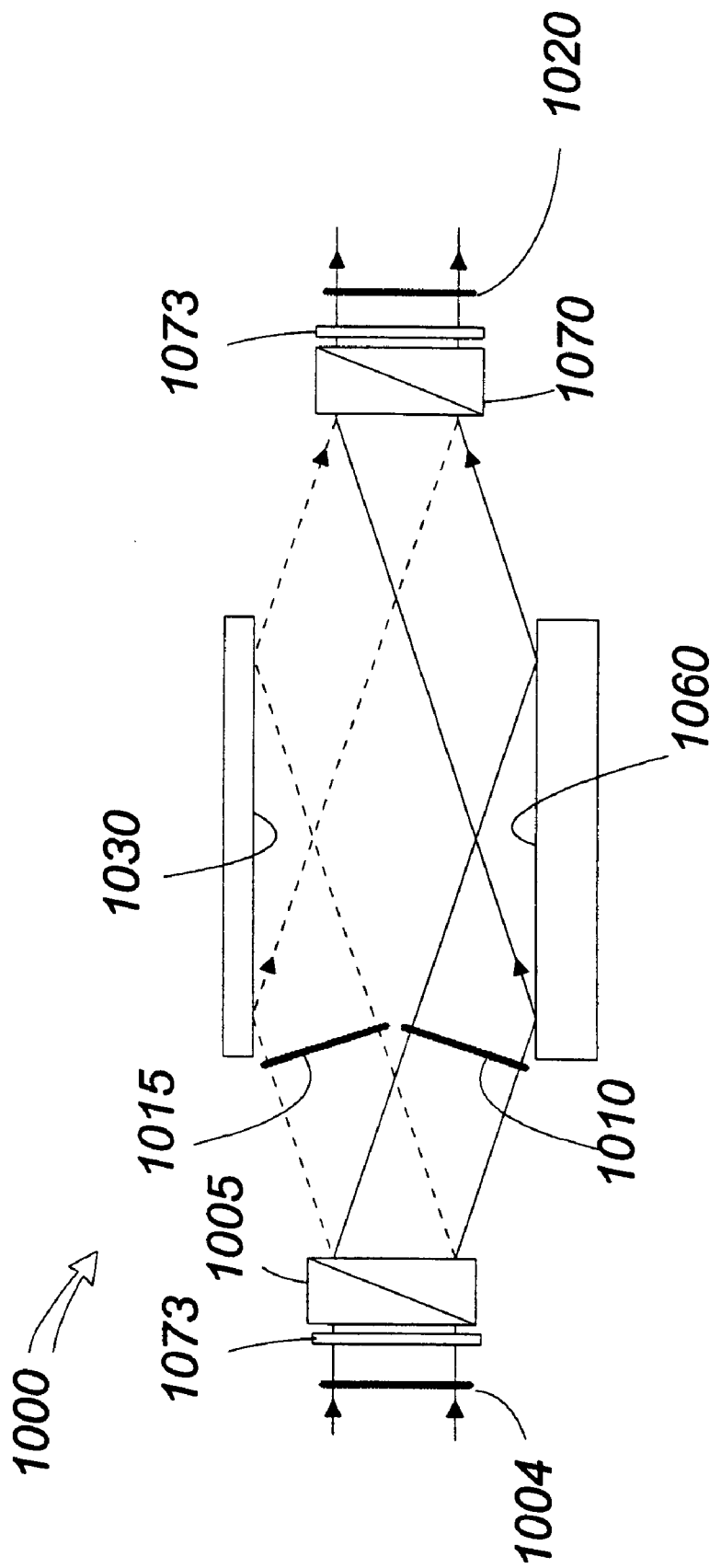
FIG. 10 is a ninth embodiment of a grazing incidence interferometer, in which birefringent crystals form beam splitting and recombination optics.

In the interferometer 1000 of FIG. 10, an initial illumination wavefront 1004 passes through a polarizer 1073 oriented so as to provide polarized light having both s and p polarization components. Here, s refers to a polarization component orthogonal to the plane of the figure, and prefers to a polarization component parallel to the plane of the figure. A birefringent beam splitter 1005, which may for example be a Wollaston prism, separates initial illumination wavefront 1004 into a reference wavefront 1015 and a measurement wavefront 1010 having orthogonal polarization states. Reference wavefront 1015 reflects once from a reference mirror 1030 and then travels to a birefringent beam combiner 1070. Measurement wavefront 1010 reflects once from a sample surface 1060 and then travels to birefringent beam combiner 1070. The recombiner 1070 recombines the reflected measurement and reference wavefronts, 1010 and 1015, to form an output wavefront 1020. Birefringent beam combiner 1070 may be of the same type as birefringent beam splitter 1005, e.g., a Wollaston prism. Output wavefront 1020 passes through a polarizer 1073 to become a final output wavefront 1020, in which the orthogonal polarization from reference wavefront 1015 and a measurement wavefront 1010 are mixed to generate interference. Final output wavefront 1020 includes interference fringe information on sample surface 1060, e.g., surface topography information, which may be analyzed by methods known to persons of ordinary skill in the art.

Figure 11:
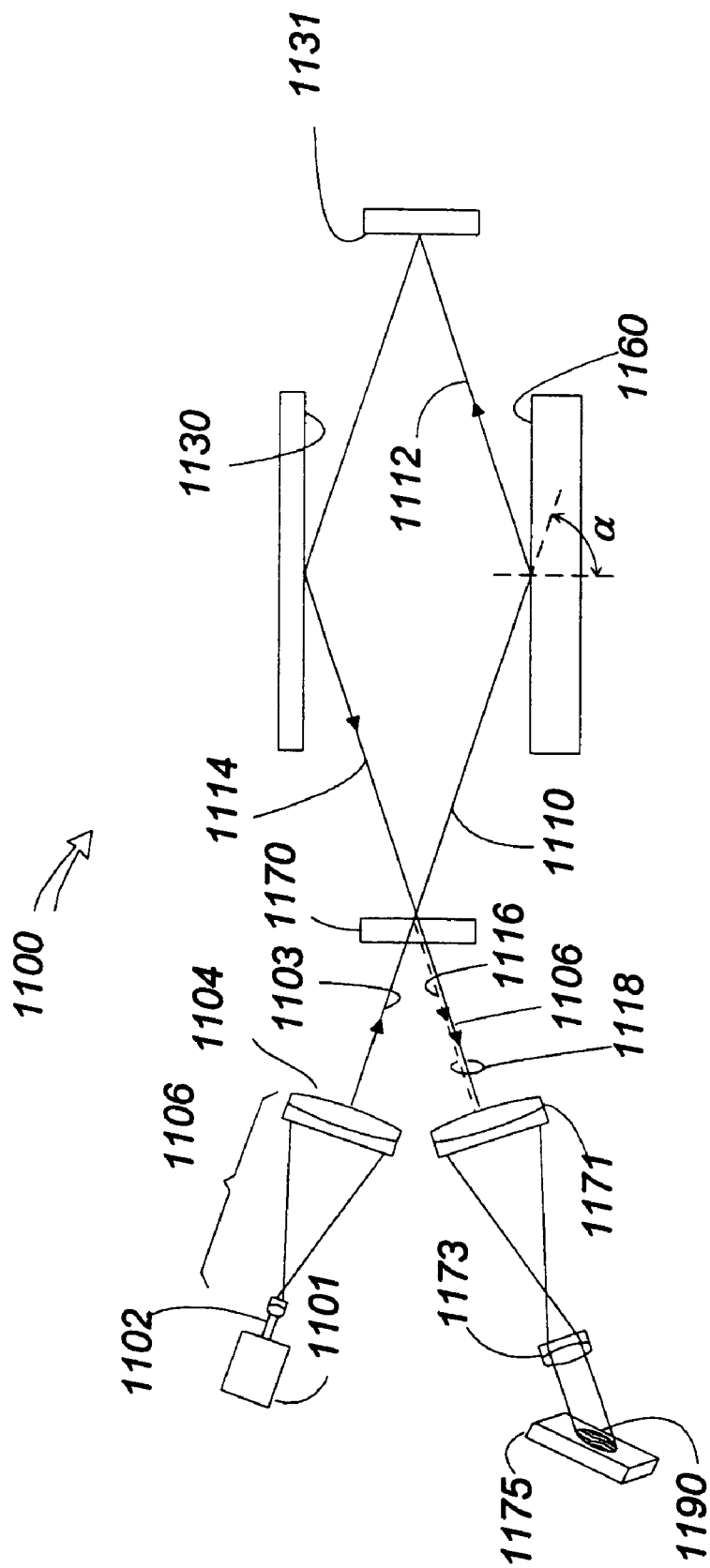
FIG. 11 illustrates a two-beam grazing incidence interferometer using a partially reflecting mirror as both a beam splitter and recombiner.

FIG. 11 illustrates grazing incidence interferometer 1100 that uses a partially reflecting mirror 1170 as both a beam splitter and a beam recombiner. A light source 1101 generates a beam 1102. After passing through expansion optics 1106, beam 1102 produces an initial illumination wavefront (not shown), the propagation path of which is represented by an incoming ray 1103. Mirror 1170 separates each incoming ray 1103 into transmitted measuring ray 1110 and reflected reference ray 1106.

Measuring ray 1110 impinges on a sample surface 1160. A portion 1112 of the measuring ray 1110, reflected off sample surface 1160, is redirected back towards partially reflecting mirror 1170 by first and second reflectors 1131, 1130. Redirected ray 1114 impinges on the point of partial mirror 1170 where transmitted measuring ray 1110 exited and makes the same angle that transmitted ray 1110 made with respect to the surface normal (not shown) of partial mirror 1170. At the mirror 1170, retransmitted measuring ray 1116 recombines with the reference ray 1106 to form an outgoing beam 1118. Lenses 1171 and 1173 form an image 1190 on a screen 1175.

Incoming ray 1103 is temporally coherent so that interference fringes can form in the image even though measuring ray 1116 combines with a portion of reference ray 1106 that is temporally retarded with respect to measuring ray 1116. Combined portions of measuring and reference rays 1116 and 1106 originate in different temporal slices of the incoming ray 1103. The timing difference between these two rays 1116 and 1106 arises, because reference ray 1106 does not traverse the path traversed by the measuring ray 1110, 1112, and 1114 between leaving and re-entering the partial mirror 1170. Thus, the incoming ray 1103 must be coherent over the time needed to traverse the path.

Other embodiments are within the scope of the following claims.

What is claimed is:

1. A two-beam grazing incidence interferometer for analyzing a surface of a sample, comprising:

a diffractive-optic beam splitter to use amplitude division to separate at least a portion of an initial wavefront generated by a light source into a reference wavefront and a measurement wavefront;

a diffractive-optic beam combiner located to generate an output wavefront by interfering portions of the reference wavefront with portions of the measurement wavefront, the portions of the measurement wavefront having undergone a reflection from the sample surface only once and at a grazing angle, the interfering portions of the reference and the measurement wavefronts originating from substantially the same portions of the initial illumination wavefront.

2. The interferometer of claim 1, further comprising:

an illumination system including the light source to generate the initial wavefront.

3. The interferometer of claim 2, further comprising:

an image forming system to form from the output wavefront an image of the sample surface, said image displaying interference fringes.

4. The interferometer of claim 3, wherein at least one of the diffractive-optic beam splitter and diffractive-optic beam combiner is a transmission device.

5. The interferometer of claim 3, wherein at least one of the diffractive-optic beam splitter and the diffractive-optic beam combiner is a reflection device.

6. The interferometer of claim 3, wherein at least one of the diffractive-optic beam splitter and diffractive-optic beam combiner is an acousto-optic modulator.

7. The interferometer of claim 3, wherein at least one of the diffractive-optic beam splitter and diffractive-optic beam combiner is constructed to suppress diffraction orders not producing either the reference wavefront or the measurement wavefront.

8. The interferometer of claim 3, wherein the reference wavefront and the measurement wavefront are the first-order diffracted wavefronts emanating from the diffractive-optic beam splitter when illuminated by the initial wavefront.

9. The interferometer of claim 3, wherein the combiner is located to recombine the measurement wavefront and the reference wavefront after each beam undergoes at least one wavefront inversion and with the number of inversions of each beam equal modulo two.

10. The interferometer of claim 3, wherein the diffractive-optic beam splitter and combiner are located to produce fringes having separations defined by an equivalent wavelength equal to the wavelength of the source divided by the cosine of an angle of incidence of the measurement wavefront on the sample surface.

11. The interferometer of claim 10, wherein the beam splitter and recombiner are adapted recombine the measurement and reference beams in response to the reference beam being reflected off the sample at an angle at least as large as 75 degrees.

12. The interferometer of claim 10, wherein the splitter is configured to produce an equivalent wavelength independent of the wavelength of the light source.

13. The interferometer of claim 12, wherein the diffractive-optic beam splitter and the diffractive-optic beam combiner are substantially identical linear gratings.

14. The interferometer of claim 1, wherein the diffractive-optic beam splitter and the diffractive-optic beam combiner have areas smaller than one half the area of sample surfaces that the interferometer is adapted to analyze.

15. The interferometer of claim 1, further comprising:
a reference mirror for redirecting and inverting the reference wavefront.

16. The interferometer of claim 3, further comprising:
a reference mirror for redirecting and inverting the reference wavefront; and
a fold mirror for redirecting both the measurement wavefront and the reference wavefront.

17. The interferometer of claim 16, wherein the diffractive-optic beam splitter and the diffractive-optic beam combiner belong to a single diffractive-optic element.

18. The interferometer of claim 1, wherein the diffractive-optic beam splitter and the diffractive-optic beam combiner are cylindrical gratings.

19. The interferometer of claim 18, further comprising:
a cylindrical reference mirror for redirecting and inverting the reference wavefront.

20. The interferometer of claim 19, wherein the diffractive-optic beam splitter and the diffractive-optic beam combiner are axicon gratings.

21. The interferometer of claim 3, wherein the image forming system further comprises a viewing screen located to display the image.

22. The interferometer of claim 21, wherein the viewing screen is oriented at an oblique angle with respect to an axis defined by the beam splitter and recombiner.

23. The interferometer of claim 22, further comprising:
an electronic camera directed towards the viewing screen.

24. The interferometer of claim 1, further comprising:
an electronic camera located to view the image.

25. The interferometer of claim 3, further comprising:
first and second reference mirrors for redirecting first and second portions of the reference wavefront; and
wherein the beam splitter is adapted to direct the first and second portions of the reference wavefront in diverging directions and to direct first and second portions of the measurement wavefront in divergent directions; and
wherein the beam combiner interferes the first and second portions of the reference wavefront with the respective first and second reflected portions of the measurement wavefront.

26. The interferometer of claim 15, further comprising:
an actuator to change the difference between optical path lengths traversed by the reference and the measurement wavefronts.

27. The interferometer of claim 26, wherein the actuator comprises a piezo-electric crystal.

28. The interferometer of claim 27, wherein the actuator is located to displace the sample in a direction substantially perpendicular the sample surface.

29. The interferometer of claim 27, wherein the actuator is located to displace an optical element of the interferometer.

30. The interferometer of claim 27, further comprising:
an electronic camera for converting the interference fringes into electronic signals; and
a computer to perform phase shifting interferometry on the sample surface with the actuator and electronic camera.

31. The interferometer of claim 3, wherein the source is monochromatic.

32. The interferometer of claim 31, wherein the source is a wavelength tunable source; and
a reference mirror for redirecting and inverting the reference wavefront and for producing path length differences of more than a few wavelengths between interfering portions of the reference and the measurement wavefronts at the combiner.

33. The interferometer of claim 32, wherein the image forming system further comprises:
an electronic camera for converting the interference fringes into electronic signals; and
a computer control for performing phase shifting interferometry using the tunable source and the electronic camera.

34. The interferometer of claim 3, wherein the source is a spectrally broadband source.

35. The interferometer of claim 3, wherein the source is an extended source that produces divergent rays in the illumination beam; and
a reference mirror for redirecting and inverting the reference wavefront and for producing path length differences of not more than a few wavelengths between interfering portions of the reference and the measurement wavefronts at the combiner.

36. The interferometer of claim 35, further comprising:
an actuator for changing an optical path length traversed by one of the reference wavefront and the measurement wavefront; and an electronic camera for converting the interference fringes into electronic signals.

37. The interferometer of claim 36, wherein the actuator comprises a piezo-electric crystal.

38. The interferometer of claim 36, wherein the actuator includes a motor-driven stage.

39. The interferometer of claim 36, wherein the actuator is oriented to displace the sample substantially perpendicular to the sample surface.

40. The interferometer of claim 36, wherein the actuator is located to displace an optical element of the interferometer.

41. The interferometer of claim 36, further comprising:
a computer control configured to perform fringe contrast-scanning interferometry using the actuator and the electronic camera to measure topography of the sample surface.

42. A two-beam grazing incidence interferometer for analyzing a surface of a sample, comprising:
a birefringent beam splitter for separating an initial wavefront produced by a light source into reference and measurement wavefronts; and
a birefringent beam combiner, located to generate an output wavefront by interfering corresponding portions of the reference and the measurement wavefronts, the portions of the measurement wavefront being reflected off the sample surface only once and at a grazing angle, each pair of corresponding portions of the reference and the measurement wavefronts originating from substantially the same portion of the initial illumination wavefront.

43. The interferometer of claim 42, further comprising:
an illumination system comprising the light source to generate the initial wavefront.

44. The interferometer of claim 43, further comprising:
an optical imaging system to form an image of the sample surface from the output wavefront, said image displaying interference fringes.

45. The interferometer of claim 44, wherein one of the birefringent beam splitter and the birefringent beam combiner comprises a Wollaston prism.

46. The interferometer of claim 44, wherein the birefringent beam combiner further comprises a polarization analyzer to mix the reference and measurement wavefronts.

47. The interferometer of claim 44, wherein the splitter is adapted to produce the reference wavefront and the measurement wavefront with orthogonal polarizations.

48. The interferometer of claim 44, wherein the recombiner is located to recombine light from the measurement wavefront reflected by the sample surface at an angle of at least 75 degrees.

49. The interferometer of claim 42, wherein the splitter and the combiner are located to be substantially smaller in area than the sample surface.

50. The interferometer of claim 42, further comprising:
a reference mirror for redirecting and inverting the reference wavefront.

51. The interferometer of claim 44, further comprising:
a reference mirror for redirecting and inverting the reference wavefront; and
a fold mirror for redirecting both the measurement wavefront and the reference wavefront.

52. The interferometer of claim 51, wherein both the birefringent optic beam splitter and the birefringent optical beam combiner are portions of a single optical element.

53. The interferometer of claim 44, wherein the optical imaging system further comprises a viewing screen positioned to produce the image.

54. The interferometer of claim 53, wherein the viewing screen is oriented at an oblique angle to an axis from the splitter to the combiner.

55. The interferometer of claim 53, wherein the optical imaging system further comprises an electronic camera directed at the viewing screen.

56. The interferometer of claim 44, wherein the optical imaging system further comprises an electronic camera for viewing the image.

57. The interferometer of claim 44, further comprising:
first and second reference mirrors for redirecting first and second portions of the reference wavefront, the first and second portions being directed in diverging directions; and
wherein the beam splitter is adapted to direct the first and second portions of the reference wavefront in different directions; and
wherein the beam combiner interferes the first and second portions of the reference wavefront with respective first and second reflected portions of the measurement wavefront.

58. The interferometer of claim 57, wherein the first and second reflected portions are reflected off opposite sides of a planar sample.

59. The interferometer of claim 44, further comprising:
an actuator located to change the optical path length traversed by one of the reference wavefront and the measurement wavefront.

60. The interferometer of claim 59, wherein the actuator includes a piezo-electric crystal.

61. The interferometer of claim 59, wherein the actuator is oriented to displace the sample in a direction substantially perpendicular the sample surface.

62. The interferometer of claim 59, wherein the actuator is located to displace an optical element of the interferometer.

63. The interferometer of claim 59, further comprising:
an electronic camera located to view the interference fringes and configured to produce electronic signals therefrom; and
a computer control configured to perform phase shifting interferometry using the actuator and the electronic camera.

64. The interferometer of claim 50, wherein the reference mirror and combiner are configured to recombine the measurement and reference surfaces after traveling over optical paths differing by more than about two equivalent wavelengths.

65. The interferometer of claim 64, wherein the source is monochromatic.

66. The interferometer of claim 64, wherein the source is a tunable to change the wavelength of emitted light.

67. The interferometer of claim 66, further comprising:
an electronic camera for converting the interference fringes into electronic signals; and
a computer control to perform phase shifting interferometry using the tunable source and the electronic camera to measure the sample surface.

68. The interferometer of claim 50, wherein the reference mirror and combiner are configured to recombine portions of the measurement and reference surfaces traveling over optical paths differing by less than about three equivalent wavelengths.

69. The interferometer of claim 68, wherein the source is a broadband source.

70. The interferometer of claim 68, wherein the source is an extended source.

71. The interferometer of claim 43, wherein the source is configured to produce the illumination beam being one of spectrally broadband and non-collimated.

72. The interferometer of claim 71, wherein the source is an extended source.

73. The interferometer of claim 71, further comprising:
an actuator to change the optical path length traversed by one of the reference wavefront and the measurement wavefront; and
an electronic camera directed to convert the interference fringes into electronic signals.

74. The interferometer of claim 73, wherein the actuator comprises a piezo-electric crystal.

75. The interferometer of claim 73, wherein the actuator comprises a motor-driven stage.

76. The interferometer of claim 73, wherein the actuator is located to displace the sample in a direction substantially perpendicular to the sample surface.

77. The interferometer of claim 73, wherein the actuator is located to displace an optical element of the interferometer.

78. The interferometer of claim 73, further comprising:
a computer control to perform fringe contrast scanning interferometry using the actuator and the electronic camera to measure the sample surface.

79. A method for performing interferometry with light reflected off a sample at a grazing angle, said method comprising:
splitting an incoming wavefront into first and second beams;
reflecting portions of the second beam off of the sample surface at a grazing angle; and
intefering portions of the first beam with the portions of the second beam by combining the portions of the first and second beams which have the relative wavefront relation of the two beams leaving the splitter.

80. The method of claim 79, wherein the splitting includes diffractively splitting the wavefront of the incoming beam into the first and second beams.

81. The method of claim 79, wherein the interfering recombines portions of the wavefronts of the first and second beams originating in the same portion of the incoming beam.

82. The method of claim 79, wherein the reflected beam is directed at more than 75 degrees from the direction of the normal to the sample surface.

83. The method of claim 79, wherein the act of interfering includes interfering portions of the two beams that have traveled over path lengths that differ by less than several wavelengths of light therein.

84. The method of claim 79, further comprising:
forming white-light fringes with light from the interfering beams.

85. The method of claim 84, further comprising:
moving the sample to a new location; and
repeating the acts of splitting, reflecting, interfering and forming on the sample surface at the new location, the new location enabling new features on the sample surface to reflect light that generates new white-light fringes.

86. An interferometer to analyze light reflected from a sample surface at a grazing angle, said interferometer comprising:
an optical element to form first and second beams by respectively reflecting and transmitting portions of an incoming beam;
at least one reflector to redirect a portion of the second beam back towards the optical element which combines the first beam and the reflected back portion of the second beam without a relative wavefront inversion, the portion of the second beam having reflected off the sample surface only once before being combined with the first beam at the optical element.

87. The interferometer of claim 86, wherein the optical element is a partially silvered mirror.

88. The interferometer of claim 86, wherein the grazing angle is at least 75 degrees from a normal to the sample surface.

* * * * *

UNITED STATES PATENT AND TRADEMARK OFFICE
CERTIFICATE OF CORRECTION

PATENT NO. : 6,249,351 B1
DATED : June 19, 2001
INVENTOR(S) : Peter De Groot

Page 1 of 1

It is certified that error appears in the above-identified patent and that said Letters Patent is hereby corrected as shown below:

Column 4,
Line 55, replace "a" with -- $\alpha$ --.

Column 5,
Line 45, delete "15".
Line 62, replace "coherence" with -- coherence, --.

Column 7,
Line 59, before "at" insert -- 460 --.

Column 8,
Lines 45 and 67, replace "2" with -- 2. --.

Column 11,
Line 18, replace "a" with -- $\alpha$ --.

Column 17, claim 79,
Line 32, replace "intefering" with -- interfering --.

Signed and Sealed this

Twenty-seventh Day of November, 2001

*Attest:*

NICHOLAS P. GODICI
*Attesting Officer*  *Acting Director of the United States Patent and Trademark Office*